Figure 1:
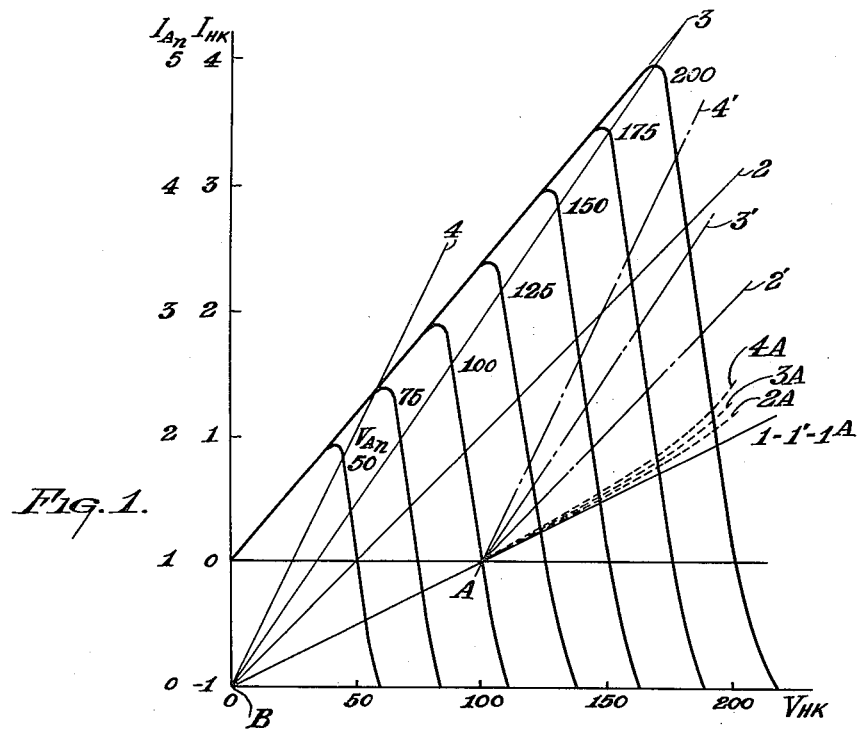

Dec. 8, 1953 W. SIX ET AL 2,662,177
SWITCHING SYSTEM USING SECONDARY EMISSION TYPE BEAM TUBES
Filed March 10, 1948 4 Sheets-Sheet 1

INVENTOR.
WILLEM SIX
JOHAN LODEWIJK HENDRIK JONKER
BY ZEGER VAN GELDER

AGENT.

Dec. 8, 1953 W. SIX ET AL 2,662,177
SWITCHING SYSTEM USING SECONDARY EMISSION TYPE BEAM TUBES
Filed March 10, 1948 4 Sheets-Sheet 2

INVENTOR.
WILLEM SIX
JOHAN LODEWIJK HENDRIK JONKER
BY ZEGER VAN GELDER

AGENT.

Patented Dec. 8, 1953

2,662,177

UNITED STATES PATENT OFFICE 2,662,177

SWITCHING SYSTEM USING SECONDARY EMISSION TYPE BEAM TUBES

Willem Six, Johan Lodewijk Hendrik Jonker, and Zeger Van Gelder, Eindhoven, Netherlands, assignors to Hartford National Bank and Trust Company, Hartford, Conn., as trustee Application March 10, 1948, Serial No. 13,996

Claims priority, application Netherlands April 21, 1947

9 Claims. (Cl. 250—27)

This invention relates to a circuit-arrangement comprising a combination of at least two relays and has for its object to realise the switching possibilities of the usual electromagnetically operating relays with the aid of electronic means.

Circuit-arrangements are known which comprise a discharge tube in which at least two collecting electrodes and a control electrode for controlling the stream of electrons from the cathode of this tube are arranged, at least one of the collecting electrodes being a secondary-emission electrode operating as an auxiliary cathode and constituting, together with at least one of the other collecting electrodes, a switch path which is completed when electrons strike the auxiliary cathode under the action of the control-electrodes. In this event at least one of the auxiliary cathodes can obtain its voltage through at least one resistance, for example a voltage divider, from an A. C. source.

However, such discharge tubes have so far not been used in relay circuit-arrangements. It has now been found that by a suitable combination of two or more of these discharge tubes it is possible to construct circuit-arrangements with a large number of switching possibilities.

The circuit-arrangement according to the invention exhibits the feature that each of the relays consists of at least two collecting electrodes housed in a discharge tube and control-electrodes for controlling the stream of electrons from the cathode of this tube in which at least one of the collecting electrodes is a secondary-emission electrode operating as an auxiliary cathode and forming, together with at least one of the other collecting electrodes, a switch path which is completed when electrons impinge on this auxiliary cathode under the action of the control-electrodes, at least one auxiliary cathode deriving its voltage, through at least one resistance, from a source of direct voltage, and with each group of co-operating relays, the voltage for one of the electrodes of at least one of the relays of this group being derived from the voltage difference between an auxiliary cathode and the cathode of another relay of this group.

In order that the invention may be more clearly understood and readily carried into effect, it will now be described more fully with reference to the accompanying drawings, given by way of example, which represents some forms of this circuit-arrangement and illustrate its operation.

Figure 2:
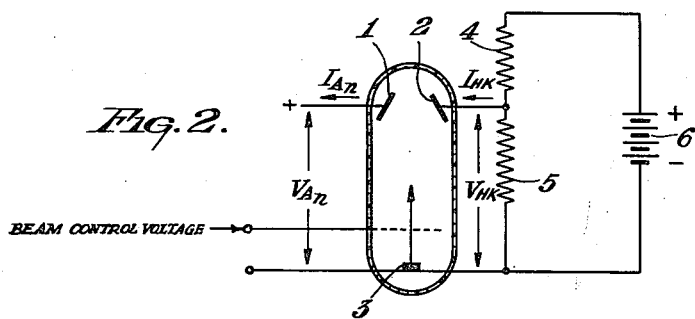

Fig. 1 shows several characteristic curves of the circuit-arrangement represented in Fig. 2 and of circuit-arrangements consisting of a combination of relays.

The circuit-arrangement shown in Fig. 2 comprises a discharge tube (not shown) which comprises two collecting electrodes 1 and 2, a cathode 3 and, in addition, control-electrodes known per se and not shown for controlling the stream of electrons from the cathode.

The collecting electrode 1, hereinafter referred to as the anode, may exhibit secondary-emission properties; in this circuit-arrangement, however, it does not function as such, whereas the collecting electrode 2, referred to hereinafter as the auxiliary cathode, is a secondary-emission electrode and functions as such. This auxiliary cathode obtains its voltage from the voltage divider formed by the resistances 4 and 5 and fed by battery 6.

Fig. 1 shows inter alia several characteristic curves of this circuit-arrangement in which the anode voltage $V_{An}$ functions as a parameter. On the ordinate axis of Fig. 1 are plotted the electron stream $I_{An}$ and $I_{HK}$ in mAmps., the positive direction coinciding with the direction of the arrows in Fig. 2. For the sake of simplicity the characteristic curves are only given for one definite choice of the value of the stream of primary electrons from the cathode, i. e. 1 mAmp. and of the value of the resistances 4 and 5, i. e. both $2 \times 10^5$ ohms and a battery voltage of 200 volts.

Since the stream of primary electrons is 1 mAmp., $I_{An}$ will always exceed $I_{HK}$ by 1 mAmp., so that the two values can be included in the same graph with a zero point shifted by 1 mAmp.

From Fig. 1 it is evident that with the aforesaid choice of values and an anode voltage $V_{An}$ of 200 volts, the electron stream $I_{An}$, as a function of the voltage $V_{HK}$ plotted on the abscissa, increases from 1 mAmp. with $V_{HK}=0$ to 5 mAmps. with $V_{HK}=170$ volts and then decreases again to 1 mAmp. when also $V_{HK}=200$ volts.

If the electron stream $I_{HK}$ were zero, the voltage $V_{HK}$ would only be determined by the potentiometer 4, 5, and amounts to 100 volts, thus the point A of the resistance line being found for the discharge tube loaded with the potentiometer 4, 5. By measurement it is found that this resistance line extends in accordance with the straight line 1, the course of which may be explained with reference to the following extrapolation. It is to be noted that in this case hypothetical extrapolation is resorted to, since owing to the said choice of the components of the circuit-arrangement shown in Fig. 2 the case occurring in this extrapolation cannot be realized. It can, however, by a different choice of these components. Assuming that the stream of electron $I_{An}$=zero, the electron stream of 1 mAmp. supplied from the cathode must disappear through the auxiliary cathode and the potentiometer 4, 5 which would means that $V_{HK}$ would drop to 0 v., which gives the point B of the resistance line 1. In the event of a voltage $V_{HK}$ dropping to zero the electron stream would naturally not leak away through the potentiometer but, as has been said, the resistance line 1 found by measurement coincides with the line found by the said extrapolation.

If the anode is directly connected to the positive terminal of the battery 6, so that $V_{An}$=200 volts, $V_{HK}$ is found at the point of intersection of the line 1 and the characteristic curve of $V_{An}$=200 volts and $V_{HK}$ is found to be 193 volts. Consequently, in this circuit-arrangement the tube behaves as a switch having a certain internal resistance. If the stream of primary electrodes does not strike the auxiliary cathode 2, $V_{HK}$ is 100 volts and consequently no "contact" is made between the electrodes 1 and 2, in other words the switch path formed by the electrodes 1 and 2 is open. If the stream of primary electrons does strike the auxiliary cathode 2, then $V_{HK}$ is 193 volts which corresponds to the establishment of a "contact" between the electrodes 1 and 2, when a loss of voltage of 7 volts accurs, in other words the switch path between the electrodes 1 and 2 is closed.

Furthermore it is to be noted that when the stream of primary electrons strikes the auxiliary cathode, i. e. when the switch path is closed, the current in the anode circuit is approximately 1.94 mAmps.

Figure 3:
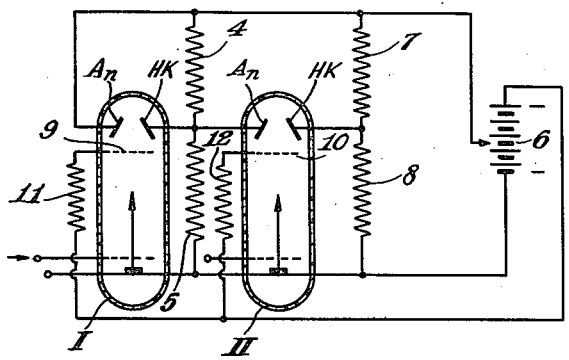

In one form of the circut-arrangement according to the invention, which is shown in Fig. 3, the auxiliary cathode of the first tube may be galvanically connected to the anode of a second tube. The value of the resistances 4, 5, 7 and 8 may, for example, again be $2 \times 10^5$ ohms, and for the supply of these potentiometers and of the anode of the first tube a voltage of 200 is again taken from the battery 6. In both discharge tubes the stream of primary electrons is 1 mAmp.

Here again hypothetical extrapolation permits the resistance line 2 for the first relay of this circuit-arrangement, in which the switch paths are consequently connected in series, to be found, which line corresponds to the line found by measurement.

If $I_{AnI}$=0 mAmp., $2 \times 1$ mAmp. must leak away through two potentiometers, so that $V_{HK}I$ will be zero. If $I_{HK}I$=0, then 1 mAmp. of the relay II must leak away through two potentiometers, so that the voltage of the two auxiliary cathodes would be 50 volts. These data permit the resistance line 2 for the first tube to be found. At $V_{AnI}$=200 v. we find with the aid of this line that $V_{HK}I$=182 v.

The voltage of the auxiliary cathode may now be found with the aid of a characteristic curve for one tube associated with an anode voltage of 182 volts and resistance line 1 and $V_{HK}II$ is then found to be approximately 177 volts.

If the first switch path is open, i. e. if the stream of primary electrons of the first tube does not hit the first auxiliary cathode, the voltages of the two auxiliary cathodes drop to 50 volts.

It is pointed out that if the two switch paths are closed, the current to the anode of the first relay is approximately 3.5 mAmps., so that owing to the series connection of two switch paths, the current strength in the anode circuit of the first relay has increased by 1.66 mAmps.

By closing the switch paths of the relays the voltage of the anode of a relay, though slightly decreased owing to the characteristics of the tube and for other reasons referred to hereinafter, is evidently tansmitted to the auxiliary cathode of this relay, and this last-mentioned voltage, upon the closure of a switch path connected in series with the first switch path, is again transmitted, likewise slightly reduced, to the auxiliary cathode of this switch path.

In the manner as described hereinbefore the resistance line 3 may be found for the first of three relays comprising series-connected switch paths, and the resistance line 4 for four series-connected switch paths. In this event it is found, however, that, for example, with four series-connected switch paths correct transmission of the anode voltage of the first relay is out of the question since, as appears from Fig. 1, at an anode voltage of 200 applied to the first anode, the voltage at the auxiliary cathode of this relay is then approximately 60 volts only.

At the same time it is found that, on opening the first switch path, the voltage of all auxiliary cathodes of the four relays is of the order of magnitude of 25 volts.

For circuit-arrangements which will be described more fully hereinafter it is of importance that the voltages of the auxiliary cathodes of the series-connected switch paths, in the event of the first switch path being closed, should not differ too much and consequently all range between 200 and 175 volts, for instance, these voltages should not differ too much also with the first switch path open. On the other hand these values should exhibit a sufficient difference from the first-mentioned values and consequently they should, for example, all be of the order of magnitude of 100 volts.

The great voltage drops occurring when a plurality of siwtch paths are connected in series are for the greater part due to the fact that the supplied stream of primary electrons of 1 mAmp. must, with each relay, always be carried off through the potentiometer.

In a favourable form of circuit-arrangement according to the invention at least one of the relays comprises a further electrode which is arranged in such manner and to which such a voltage is fed that the stream of electrons from the auxiliary cathode to this further electrode is equal or substantially equal to the stream of electrons hitting the auxiliary cathode.

In the circuit-arrangement shown in Fig. 3 electrodes of this kind are represented diagrammatically in the relays I and II at 9 and 10. In this case they are grid-shaped and connected, through resistances 11 and 12, to a suitable voltage which will usually exceed that of the collecting electrodes of the relay tubes.

The characteristic curves of the circuit-arrangement wherein the discharge tubes comprise such further electrodes, are similar to those shown in Fig. 1, provided that the ordinate values for $I_{An}I$ are reduced by 1 mAmp. Then resistance lines 1', 2', 3' and 4' are found for 1, 2, 3 and 4 series-connected switch paths respectively. For example, with four series-connected switch paths, all of which are closed, an anode voltage of 200 volts for the first-relay involves a voltage of 178 at the first auxiliary cathode, whereas in the former circuit-arrangement this voltage was approximately 60. On opening the first switch path the voltage at the first auxiliary cathode is substantially equal to 100 volts, whereas without compensation of the primary stream it would approximately be 25 volts. As a result of this compensation it is consequently possible to connect a greater number of switch paths in series.

A further possibility will be described with reference to the circuit-arrangement shown in Fig. 4.

Both the discharge tube of relay II and of relay III comprises two collecting electrodes 13 and 14. The electrode 13 is plate-shaped, and directly connected to the battery, whereas the electrode 14 is grid-shaped and arranged between the auxiliary cathode and the electrode 13. Consequently, the output voltage of the relay I is not fed to the anode 13 but to the grid-shaped electrode 14, which also occurs with the following relays.

These grid-shaped electrodes are constructed and arranged in such manner that the greater part of the stream of electrons travelling from the auxiliary cathode to the anodes 13, 14 passes by the grid-shaped electrode and reaches the electrode 14, the mean potential in the plane of the grid-shaped electrode differing only slightly from the potential of the grid wires, in order to affect the potential of the auxiliary cathode as little as possible. Thus a passage of 90% of the total electron stream is readily obtainable.

From the foregoing it appears that the anode current in a relay increases as there are more switch paths connected in series behind it. On using the present invention, however, only about one tenth need flow away through the switch path, so that an appreciable improvement is achieved. When the switch path is put into circuit, only one tenth flows through the preceding switch path and consequently a $10^{-n}$th part through the $n$th preceding switch path.

The resistance lines for the first tube of such an arrangement with which no, one, two or three switch paths are connected in series are designated 1A, 2A, 3A and 4A respectively in Fig. 1. Here the line for a relay consequently coincides with the resistance lines 1 and 1', and in the event of series-connection of a plurality of switch paths the position of the resistance lines is only slightly different. This permits a large number of switch paths to be connected in series, which is of great importance, for example, with the use of these relay combinations for automatic telephony purposes.

The preceding arrangements and those described hereinafter may exhibit the disadvantage that the stream of primary electrons from the cathode might partly strike the anode in a relay. Naturally, this disadvantage is intimately related with the type and construction of the discharge tubes used. If the opening and closing operations of the switch path of a relay are effected with the aid of one or more grid-shaped electrodes by means of which the electron stream can be suppressed and in which, consequently, formation into a sharp beam does not occur, comparatively many electrons will tend to travel directly to the anode.

If the tube is constructed to be a cathode-ray tube, in which engagement and disengagement of the relay is effected by means of suitable voltages that are fed to the deflection electrodes, the beam is preferably directed to the auxiliary cathode.

In both cases, however, it is useful to provide in each relay two control-electrodes (designated 15 and 16 in Fig. 4) which are arranged on either side of the spatial angle formed by the collecting electrodes and the cathode, between the collecting electrodes and the cathode. In this event the electrode 15 is conductively connected to the auxiliary cathode and the electrode 16, for example, to the plate-shaped anode with the result that a distribution of potentials occurs by which the stream of electrons, if these electrodes are suitably arranged, is deflected in the direction of the auxiliary cathode.

Figure 4:
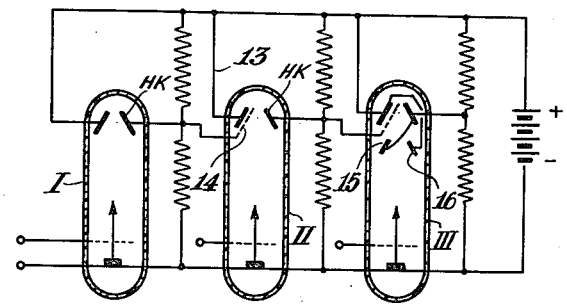
Figure 5:
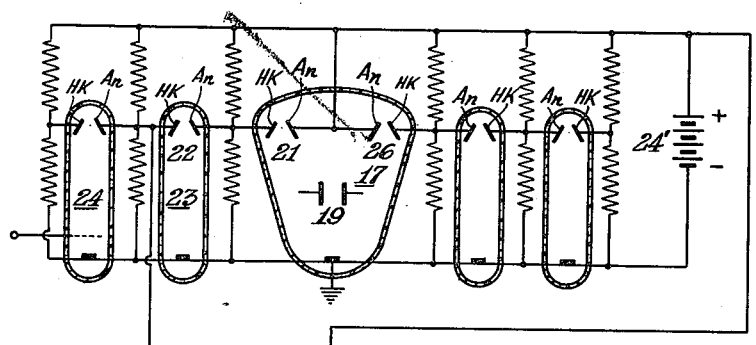
Figure 5:
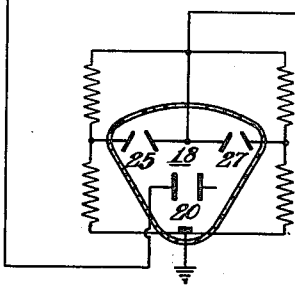

Fig. 5 shows a further form of a circuit-arrangement according to the invention, in which the improved forms described with reference to Figs. 3 and 4 are omitted for the sake of simplicity.

The arrangement represented comprises two change over relays 17 and 18, wherein the discharge tubes are constructed to be cathode-ray tubes comprising electrostatic deflection means 19 and 20 respectively and furthermore two switch paths each. If, for example, the right-hand deflection electrode of deflection means 19 has a constant voltage of 150, and if a voltage of 200 is applied to the left-hand deflection electrode, the beam will close the left-hand switch path 21 of the relay 17. If the switch path 22 of the relay 23 is likewise closed, which is likewise obtainable by electrostatic deflection of the stream of primary electrons of the cathode of this relay, a voltage slightly lower than the battery voltage of 200 volts of the battery 24 is set up at the auxiliary cathode of the relay 23. On closed switch path of the relay 24 this voltage can be passed again to the auxiliary cathode of this relay. Alternatively the voltage of the auxiliary cathode of the relay 22 may be fed to the left-hand deflection electrode of the alternating relay 18 simultaneously or, on disengaged relay 24, exclusively. If the right-hand deflection electrode of this change over relay has a constant potential of, say, 150 volts, the switch path 25 of this relay will be closed owing to the voltage of approximately 200 volts supplied to the left-hand deflection electrode.

However, if a voltage of 100 volts has been applied to the left-hand deflection electrode of the change over relay 17 the switch path 26 of this relay would have been put into circuit. In this event the voltage at the auixiliary cathode of this relay would have been approximately 100 volts, with the result that the switch path 27 of the change over relay 18 would be closed.

From the foregoing appears at the same time the importance of taking the necessary steps for obtaining voltages at the auxiliary cathodes, which voltages, on closed switch paths, are approximately equal and, on opened switch paths, again equal but are then sufficiently different from the value on closed switch path. If, on closed switch path, the voltage of an auxiliary cathode is about 100 volts it is possible, for example with a symmetrical construction of the change over relay, to apply to one of the deflection electrodes of this relay a constant voltage of, say, 145 volts, irrespective of the auxiliary cathode with which the other deflection electrode is coupled, whereas in the case of the auxiliary cathode voltages being not sufficiently constant, the constant voltage set up at one of the deflection electrodes of a change over relay should constantly be adapted to the voltage which may occur at the auxiliary cathode with which the other deflection electrode of the change over relay is coupled.

It will be obvious that also with those relays which are not constructed as a change over relay, use may be made of electrostatic deflection for opening and closing the switch path. In this event the discharge tube may be provided with an additional collecting electrode, which is hit by the electron beam on disengaged switch path.

Both in the last-mentioned construction of the discharge tube and in the change over relay it is advisable to give the electron beam a flat section, the smallest dimension of which extends in the direction of deflection, the auxiliary cathodes of the tube having a large size with respect to the smallest dimension of the beam in the direction of deflection, since in this event there is a rather abrupt transition from opened to closed switch path, and at the same time the beam has a certain tolerance in striking the auxiliary cathode, so that the differences in deflection voltages, which can be entirely obviated only with difficulty, cannot have a detrimental effect.

Figure 6:
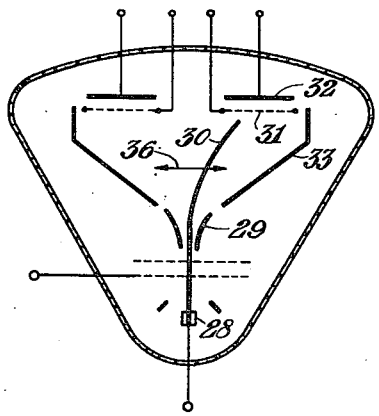

A suitable form of such a discharge tube is represented diagrammatically in Fig. 6.

The electrons from the cathode 28 first pass the electrodes required for forming the beam and then enter the space between the deflection plates 29 which are slightly conical. Under the action of a deflection voltage applied to these plates the beam 30 passes a grid 31 and hits the auxiliary cathode 32 of the right-hand switch path, the anode of which is designated 33. In this event the grid 31 has a function similar to that of the grid 14 shown in Fig. 4. Both the beam and the electrodes shown extend over a certain length at right angles to the plane of the drawing. Consequently the beam exhibits a flat section, the smallest dimension of which extends in the direction of deflection indicated by the arrow 36. In this direction the auxiliary cathode 32 exhibits a large extension as compared with the smallest beam dimension, so that upon a slight variation of the deflection voltage, such as may occur in the use of the same type of change over relays, which is universally employed and consequently does not always receive the same deflection voltage from an auxiliary cathode of a preceding tube, the beam will nevertheless strike the desired auxiliary cathode. On the other hand, on changing over of the relay to the other switch path there is an adequate separation between these two switch paths owing to the small dimension of the beam in the direction of deflection.

Figure 7:
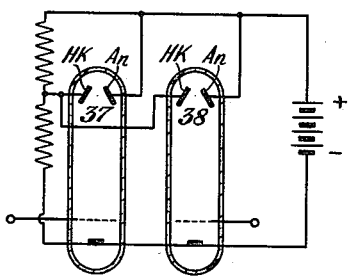

So far only a combination relay has been discussed, in which the switch paths are connected in series, but parallel-connection of the switch paths is also obtainable in a simple manner, as appears from Fig. 7.

In this arrangement the anodes of the two relays 37 and 38 are interconnected, the auxiliary cathode of the relay 38 obtaining its voltage, by direct coupling, from the auxiliary cathode of the relay 37.

It may be observed that it is also possible to control in parallel two different relays by applying, for example, when using electrostatic deflection in both relays, the same deflection voltages to the two deflection systems, with the result that corresponding switch paths are opened or closed. Alternatively, the control may be effected anti-parallel in which event the two deflection voltages are equal, it is true, but are supplied with opposite polarities, so that if in one relay a switch path is opened, corresponding relays close the corresponding switch path in the other relay.

With many uses of relay arrangements it is desirable that definite relays should be operated with a certain delay.

In one example of the circuit-arrangement according to the invention such a delay is obtainable if the voltage which the relay concerned obtains from a preceding relay is fed to the relay concerned through a delaying network.

Figure 8:
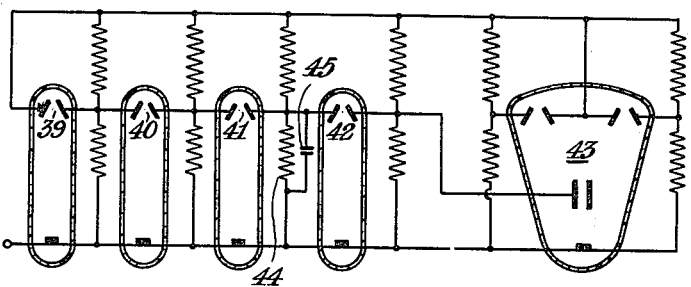

Fig. 8 shows a circuit-arrangement in which such a delay is employed.

Here again the switch paths 39, 40, 41 and 42 of a number of relays are interconnected in series, the voltage of the auxiliary cathode 42 being applied to a deflection plate of the change over relay 43.

In order to ensure delayed operation of the relay 42 the voltage of the auxiliary cathode of the relay 41 is applied, through a delaying network consisting of a resistance 44 and a condenser 45 connected in parallel therewith, to the anode of the relay 42.

In a favourable form of the arrangement the voltage derived from a preceding relay is fed, through a rectifier and a delaying network, to the relay to be delayed, or rectifier is included in this network.

Figure 9:
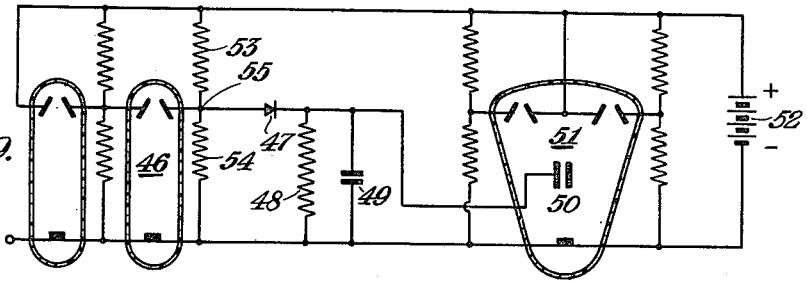

This circuit-arrangement is shown in Fig. 9.

The voltage taken from the auxiliary cathode of the relay 46 is supplied through a rectifying cell 47 and a delaying network 48, 49 to the deflection electrode 50 of the change over relay 51. If the battery voltage of the battery 52 is, for example, 200 volts, and if the resistances 53 and 54 are equal, the voltage set up at the auxiliary cathode of the relay 46 is 100 volts if the switch path is open; this voltage will likewise occur at the deflection electrode 50 after a certain time which is determined by the RC-time of the network 48, 49.

If the switch path of the relay 46 is abruptly closed, with the result that the voltage at the point 55 abruptly increases to approximately 200 volts; this voltage will likewise occur, after the desired relay, at the deflection plate 50.

If subsequently the switch path 46 is abruptly opened, so that the voltage at the point 55 drops, the rectifying cell does not pass current, since the voltage on the right-hand side of the cell is higher than on the left-hand side. In this manner it is achieved that the desired delayed commutation of the relay 51 occurs, but that no delay occurs at the point 55, so that any further switch paths connected in series with the switch path 46 will not be delayed.

In a further form of the circuit-arrangement according to the invention one of the deflection plates of a discharge tube constructed as a cathode-ray tube is connected through a resistance, to a constant voltage, whereas the other deflection plate obtains its voltage from an auxiliary cathode of a preceding relay, a condenser being connected in parallel with the deflection plates.

Figure 10:
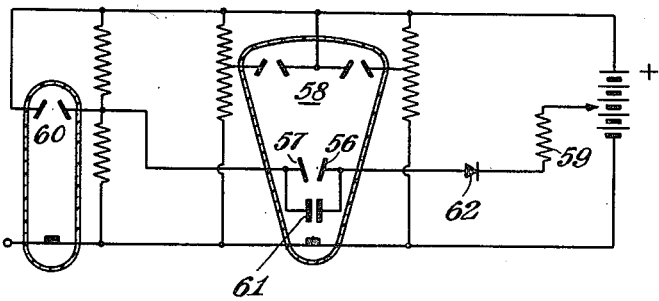

Such a circuit-arrangement is shown in Fig. 10.

The deflection plate 56 of the relay 48 is connected through a resistance 59 to a constant voltage of, say, 150 volts. The deflection plate 57 receives its voltage from the auxiliary cathode of the relay 60, hence this voltage is 100 or 200, according as the switch path of this relay is opened or closed. A capacity 61 is connected in parallel with the deflection plates. In the starting position the voltage set up at the right-hand deflection plate 56 is, for example, 150 volts and at the plate 57 100 volts. If the switch path of the relay 60 is closed, when the voltage set up at the auxiliary cathode increases to approximately 200, the voltage at the deflection plate 56 likewise increases, since the time constant RC (R being for the greater part determined by the value of the resistance 59 which is chosen to be high) largely exceeds the time of switching on. The condenser C is only slowly discharged, so that a delayed adjustment of the position of the cathode-ray beam occurs, but on the other hand the voltage at the auxiliary cathode is practically not affected thereby, since the resistance 59 has a high value.

Figure 11:
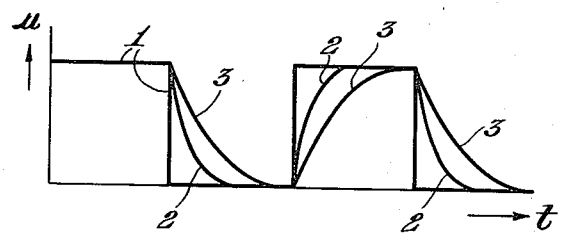

In Fig. 11 the deflection U of the beam is plotted against the time $t$; in this graph the curve 1 in block-form is obtained if the voltage set up at the auxiliary cathode periodically varies abruptly from 100 to 200 volts and conversely and the condenser 61 is not present. Curves 2 and 3 illustrate the variation of the deflection of the beam when a condenser is used, the condenser in the case 3 having a higher capacity than in the case 2. If it is desired to render the delay in back and forth movement of the beam different, a rectifying cell 62 may be included, for example, in series with the resistance 59.

In a further form of the circuit-arrangement according to the invention one of the deflection electrodes of the relay constructed as a cathode-ray tube is connected, through a resistance, to a source of direct voltage, and the end of this resistance remote from the source of direct voltage is, moreover, connected through the series-connection of a resistance and a condenser to a direct voltage of at least equal value, the junction point between this resistance and capacity being connected to a collecting electrode housed in the cathode-ray tube. Upon the switch path of the relay to be delayed being closed, this collecting electrode intercepts part of the electron beam.

Figure 12:
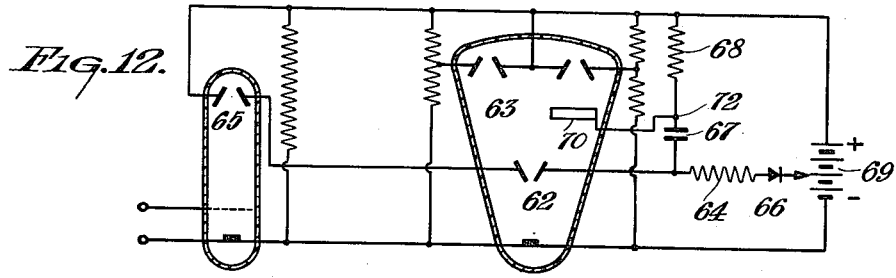
Figure 13:
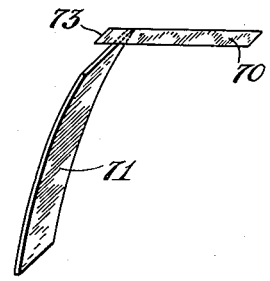
Figure 14:
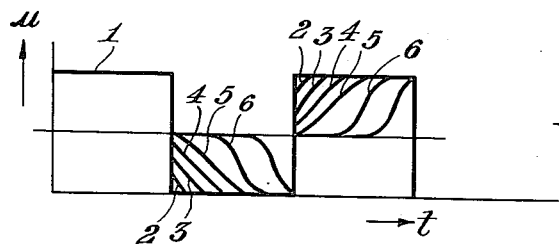

The operation of this circuit-arrangement will be described more fully with reference to Figs. 12, 13 and 14.

The right-hand deflection plate 62 of the change-over relay 63 is connected, through a resistance 64, to a voltage of, say, 150 volts, whereas the left-hand deflection plate obtains its voltage from the auxiliary cathode of the relay 65; this voltage may consequently be approximately 100 or approximately 200 volts.

The deflection plate 62 is furthermore connected, through the condenser 67 and resistance 68, to the positive terminal of the battery 69. The junction point between the resistance 68 and the condenser 67 is connected to an electrode arranged within the cathode-ray tube. Assume that the beam initially closes the left-hand switch path, so that 200 volts are applied to the left-hand deflection plate and 150 volts to the right-hand deflection plate. If the switch path of the relay 65 is opened, the voltage at the auxiliary cathode of this relay drops to 100 volts and the cathode-ray beam of the change-over relay 63 tends to move to the right. After a given deflection part of this beam is intercepted by the electrode 70. For clearness' sake Fig. 13 shows the beam as a flat bent strip 71 which consequently has a flat section and of which a part is intercepted by the electrode 70. Owing to this interception a current flows through the resistance 68 and the voltage at the point 72 drops, and since the time constant RC of the arrangement is great as compared with the switching-on time, the voltage at the right-hand deflection plate 62 will likewise drop, which counteracts the deflection of the cathode-ray beam. This movement is consequently damped and the beam will occupy a position of equilibrium which, by a suitable choice of the resistances 64 and 68, is preferably such that the beam adjusts itself to the edge 73 of the electrode 70. Then the beam tends to shift slowly, since a current is still flowing which counteracts the discharge of the condenser 67. When this current increase ceases, the condenser tends to discharge and the beam attains its final position.

The rectifying cell 66 serves again to obtain different delays in two directions.

The curve 1 shown in Fig. 1 illustrates the deflection U of the beam as a function of the time $t$ if no particular measures are taken and the voltage varies periodically from 100 to 200 and conversely. The curves 2, 3, 4, 5 and 6 exhibit the deflection of the beam when employing a condenser 67 and increasing values of the resistances 64 and 68.

Furthermore it may be observed that this arrangement yields a delayed operation of the relay without the occurrence of any delay at one or more of the collecting electrodes associated with the switch paths.

It will be evident from the foregoing that with the aid of the circuit-arrangements according to the invention the switching possibilities usually allowed by electromagnetic relays are also obtained by electronic means. Therefore such circuit-arrangements may be employed in the communication technique, for example, as relay arrangements in automatic telephone exchanges. They offer, for example, the advantage that undue inertia phenomena do not play a part, whilst the maintenance work in such exchanges will practically be confined to the replacement of discharge-tubes, and disturbances and maintenance work due to soiled and worn out contacts occurring with normal relays are disposed of.

What we claim is:

1. A switching circuit arrangement comprising first and second relay devices each constituted by an electron discharge tube including an electron-emissive cathode, two spaced collecting electrodes one of which is emissive of secondary electrons to form an auxiliary cathode, means to control the flow of electrons from the cathode to said collecting electrodes, the secondary electrons emitted by said auxiliary cathode flowing to the other collecting electrode to define a switching path therebetween, means to apply direct-current potentials to the collecting electrodes of said relay devices, a first resistance element interposed between the auxiliary cathode of said first relay device and the direct-current potential applied thereto, a second resistance element connected between the auxiliary cathode and the cathode of said first relay device, and means to apply the voltage developed across said second element to one of the electrodes in said second relay device.

2. A switching circuit arrangement comprising first and second relay devices each constituted by an electron discharge tube including an electron emissive cathode, two spaced collecting electrodes one of which is emissive of secondary electrons to form an auxiliary cathode, and a control electrode interposed between said cathode and said collecting electrodes to control the flow of electrons from the cathode to said collecting electrodes, the secondary electrons emitted by said auxiliary cathode flowing to the other collecting electrode to define a switching path therebetween, one of said tubes further including focusing means to form the electrons emitted by said cathode into a band-shaped beam, deflection means to laterally deflect said beam, the smallest dimension of said beam extending in the direction of deflection, the dimension of the auxiliary cathode in the direction of deflection of the beam being large with respect to the smallest dimension of the beam, means to apply direct-current potentials to the collecting electrodes of said first and second devices, a first resistance element interposed between the auxiliary cathode of the first relay device and the direct-current potential applied thereto, a second resistance element connected between the auxiliary cathode and the cathode of said first relay device, and means to apply the voltage developed across said second element to one of the electrodes in said relay device.

3. A switching circuit arrangement comprising first and second relays each having at least one switching element and mutually independent control means for opening and closing the associated element, the control means for one relay being operative via a circuit including the switching element of the other relay, each relay being constituted by an electron discharge system including a cathode for emitting primary electrons, two collecting electrodes one of which possesses a secondary emission factor exceeding unity to form an auxiliary cathode, said collecting electrodes constituting the terminals of said switching element, and means for controlling the electron flow from said cathode to said auxiliary cathode, the secondary electrons emitted by said auxiliary cathode when impinged on by said primary electrons flowing to the other collecting electrode to close said switching element, a resistance, means to apply through said resistance a voltage to said auxiliary cathode of each relay which is positive relative to the cathode thereof, and means galvanically connecting the auxiliary cathode of one relay to one of the collecting electrodes of the other relay to apply thereto the voltage developed at said auxiliary cathode.

4. A switching circuit arrangement comprising first and second relays each having at least one switching element and mutually independent control means for opening and closing the associated element, the control means for one relay being operative via a circuit including the switching element of the other relay, each relay being constituted by an electron discharge system including a cathode for emitting primary electrons, two collecting electrodes one of which possesses a secondary emission factor exceeding unity to form an auxiliary cathode, the other collecting electrode being non-emissive to form an anode with respect to said auxiliary cathode, said collecting electrodes constituting the terminals of said switching element, and means for controlling the electron flow from said cathode to said auxiliary cathode, the secondary electrons emitted by said auxiliary cathode when impinged on by said primary electrons flowing to the other collecting electrode to close said switching element, a resistance, means to apply through said resistance a voltage to said auxiliary cathode of each relay which is positive relative to the cathode thereof, and means galvanically connecting the auxiliary cathode of one relay to one of the coelcting electrodes of the other relay to apply thereto the voltage developed at said auxiliary cathode.

5. An arrangement, as set forth in claim 4, further including means to provide a substantially constant voltage to the anode of the first relay which is positive relative to the cathode thereof, and means galvanically connecting the auxiliary cathode of the first relay to the anode of the second relay whereby the switching elements of the two relays are connected in series.

6. An arrangement, as set forth in claim 4, further including means to interconnect the anodes of said two relays and means to interconnect the auxiliary cathodes of said relays whereby the switching elements of the two relays are connected in parallel.

7. An arrangement, as set forth in claim 4, further including means to connect the switching elements of the first and second relays in series, means to apply a constant positive voltage relative to cathode to the anodes of said first and second relays, and an additional collecting electrode in one of said relays which is grid-shaped and is interposed between the auxiliary cathode and the anode and is galvanically connected to the auxiliary cathode of the preceding relay.

8. An arrangement, as set forth in claim 4, further characterized in that the electron discharge tube of one of the relays includes two pairs of collecting electrodes, means to form an electron beam, and beam deflection means, one collecting electrode of each pair operating as an auxiliary cathode, the deflection means acting to actuate either of the switching elements constituted by the collecting electrode pairs, whereby the relay acts as a change over switch.

9. An arrangement, as set forth in claim 8, wherein each of the switching elements of the change over switch relay is connected in series with the switching element of another relay.

WILLEM SIX.
JOHAN LODEWIJK
HENDRIK JONKER.
ZEGER VAN GELDER.

References Cited in the file of this patent

UNITED STATES PATENTS

| Number | Name | Date |
|---|---|---|
| 2,171,214 | Jonker et al. | Aug. 29, 1939 |
| 2,257,795 | Gray | Oct. 7, 1941 |
| 2,293,177 | Skellett | Aug. 18, 1942 |
| 2,293,417 | Thompson | Aug. 18, 1942 |
| 2,309,019 | Skellett | Jan. 19, 1943 |
| 2,369,750 | Nagy et al. | Feb. 20, 1945 |
| 2,387,018 | Hartley | Oct. 16, 1945 |
| 2,416,355 | Skellett | Feb. 25, 1947 |
| 2,428,819 | Skellett | Oct. 14, 1947 |
| 2,500,807 | Jager | Mar. 14, 1950 |

FOREIGN PATENTS

| Number | Country | Date |
|---|---|---|
| 472,717 | Great Britain | Sept. 29, 1937 |